United States Patent
Gist

[11] 3,736,691
[45] June 5, 1973

[54] CHROME SLIDE LOCK BEAD BAIT HOLDER

[76] Inventor: Lewis L. Gist, 1039 Azalea Avenue, McKinleyville, Calif. 95521

[22] Filed: Sept. 30, 1971

[21] Appl. No.: 185,232

[52] U.S. Cl. ................................ 43/44.8, 43/44.82
[51] Int. Cl. ............................................ A01k 83/06
[58] Field of Search ............. 43/44.8, 44.82, 44.86, 43/44.2, 44.4, 44.6, 43.16

[56] References Cited
UNITED STATES PATENTS

| | | | |
|---|---|---|---|
| 742,093 | 10/1903 | Henderson et al. | 43/44.82 |
| 979,891 | 12/1910 | Schield | 43/44.2 |
| 2,087,369 | 7/1937 | Woodring | 43/44.8 |
| 2,564,216 | 8/1951 | Stark | 43/44.8 |
| 2,591,764 | 4/1952 | Allen | 43/44.8 |
| 2,808,678 | 10/1957 | Leonardi | 43/44.8 |
| 2,972,831 | 2/1961 | Anselmi | 43/44.8 X |
| 2,983,066 | 5/1961 | Poehlman | 43/44.8 X |
| 3,061,968 | 11/1962 | Stroud | 43/44.8 |
| 3,327,423 | 6/1967 | Kotis | 43/44.2 |

Primary Examiner—Hugh R. Chamblee
Assistant Examiner—James H. Czerwonky

[57] ABSTRACT

A bait holding hook assembly for sports fishing, the device consisting of an elongated wire shaft having a back hook permanently affixed to a rear end of the wire shaft. A slide hook is slideable along the length of the wire shaft and is selectively securable along any position thereof by means of a lock bead. The shank of the slide hook has an obtuse bend, and the lock bead is slidably fitted on the slide hook shank between the bend and its hook portion and also around the wire shaft so that the slide hook can be relatively closer or further from the back hook.

2 Claims, 1 Drawing Figure

PATENTED JUN 5 1973
3,736,691
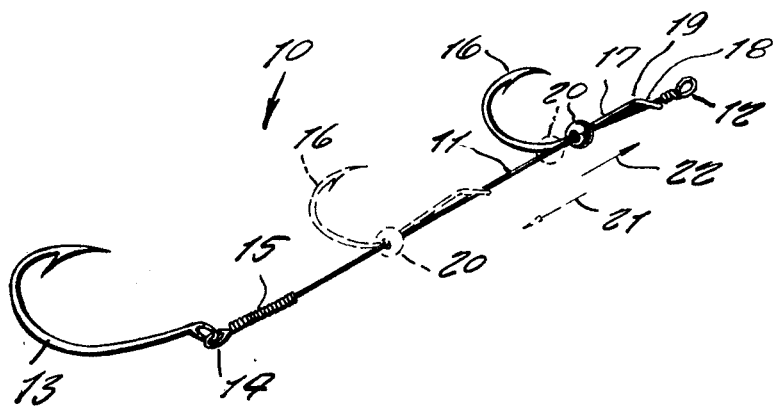
INVENTOR.
Lewis L. Gist

CHROME SLIDE LOCK BEAD BAIT HOLDER

This invention relates generally to fish equipment. More specifically the present invention relates to fishing hook units used specifically for sports fishing.

A principal object of the present invention is to provide a bait holder wherein there is a slide hook that is selectively adjustable in distance from a back hook.

Yet another object of the present invention is to provide a bait holder wherein the slide hook is slideable along a wire shaft and is selectively locked in a desired position along the wire shaft by means of a lock bead fitted on the wire shaft and also on the shank of the slide hook, the slide hook shank being slightly angled respective to the wire shaft so that the lock bead can be wedged for securement.

Yet another object of the present invention is to provide a chrome slide lock bead bait holder which is to used primarily for holding frozen anchovy bait fish wherein the trail of the bait fish is hooked on a back hook and the head of the bait fish is hooked on a slide hook.

Other objects of the present invention are to provide a chrome slide lock bead bait holder which is simple in design, inexpensive to manufacture, rugged in construction, easy to use and efficient in operation.

These and other objects will be readily evident upon a study of the following specification and the accompanying drawing wherein:

The sole FIG. 1 compries a perspective view of the present invention, and showing in phantom lines an alternate position of a slide hook.

Referring now to the drawing in detail, the reference numeral 10 represents a chrome slide lock bead bait holder according to the present invention wherein there is a length of wire shaft 11 and which is made of stainless steel so to be rust resistent when used in salt water.

A loop 12 is formed at one end of the wire shaft with a spinner making machine. The other end of the wire shaft is bent to shape and then a back hook 13 is slipped on the wire shaft and the wire is then wrapped after forming the loop 14, the wrapped wire forming the wrapping 15. This wrapping may also be made with a spinner making machine.

It is to be noted that the single hook back hook 13 may be substituted by a treble hook if so preferred. The back hook as well as the wire shaft is made of stainless steel.

A slide hook 16 may be likewise made of stainless steel to prevent corrosion in salt water is slideably fitted upon the wire shaft 11, the slide hook including a shank 17 which at its one end has a hook eye 18.

As is shown in the drawing, the bend is formed along the shank 17 so that a major portion of the shank 17 extends at an inclined angle respective to the wire shaft 11, and a lock bead 20 is slideably fitted upon the shank 17 as well as upon the wire shaft 11.

The lock bead 20 is made from a split hollow chrome plated brass bead material. When the lock bead is slid into the direction as indicated by the arrow 21, the slide hook is in an unlocked position and is freely able to be slid along the wire shaft in either direction. When the lock bead 20 is slid into the direction as indicated by the arrow 22, the lock bead moves along the diverging shank 17 and the wire shaft so to become wedged thereupon and thus lock the slide hook in a stationary position along the wire shaft.

The locking action is such that when the slide hook is pulled on, while holding the shaft eye 12, the slide hook gets set even tighter.

It is to be noted that the hooks used in the present invention can be made of metals other than stainless steel, such as for example being nickel plated.

Thus there is provided a novel chrome slide lock bead bait holder.

What I now claim is:

1. In a chrome slide lock bead bait holder, the combination of an elongated wire shaft, one end of said wire shaft having a back hook secured thereto, and opposite end of said wire shaft being attachable to a fishing line, and a slide hook slidable upon said wire shaft, and means for securing said slide hook in a selected position along said wire shaft, said wire shaft comprising an elongated stainless steel wire which at its forward end is provided with a loop for securement to said fishing line, a rear end of said wire shaft being looped for stationary securement to said back hook, and the opposite ends of said wire shaft then being wrapped, said slide hook comprising a stainless steel hook member which at one end has a hook eye slidably fitted on said wire shaft, said slide hook having a shank extending from said hook eye and ending in a hook portion, and an intermediate portion of said slide hook shank having an obtuse bend, the major portion of said shank between said bend and said hook portion extending at an acute angle with respect to said wire shaft, and a lock bead being slidably fitted on said slide hook shank between said bend and said hook portion and also around said wire shaft for slidable movement between said bend and said hook portion.

2. The combination as set forth in claim 1 wherein said lock bead is made from split hollow chrome plated brass material, said lock bead when moved in a direction toward said bend portion extends divergingly from said wire shaft and causes said slide hook to become locked, and wherein said lock bead when slid in the opposite direction causes said slide hook to become unlocked from said wire shaft.

* * * * *